United States Patent [19]
Castella

[11] Patent Number: 6,061,554
[45] Date of Patent: May 9, 2000

[54] ELECTROMAGNETIC INTERFERENCE SUPPRESSING DEVICE

[76] Inventor: Jean-Pierre Castella, 23 Les Hauts Du Lac, 83890 Besse/issole, France

[21] Appl. No.: 08/855,302

[22] Filed: May 13, 1997

[51] Int. Cl.⁷ ...................................................... H04B 1/18
[52] U.S. Cl. .......................... 455/297; 340/547; 340/351; 330/149
[58] Field of Search .................. 455/296, 297, 455/311, 305, 303; 340/547, 551, 552; 330/149

[56] References Cited

U.S. PATENT DOCUMENTS

| | | | |
|---|---|---|---|
| 2,771,586 | 11/1956 | Di Toro . | |
| 3,256,487 | 6/1966 | Sinninger . | |
| 4,081,740 | 3/1978 | Teratani et al. . | |
| 4,258,329 | 3/1981 | Tokumo | 330/149 |
| 4,539,617 | 9/1985 | Delaney et al. . | |
| 5,142,164 | 8/1992 | Chu | 307/105 |
| 5,166,637 | 11/1992 | Wurcer | 330/257 |
| 5,812,673 | 9/1998 | Nohara et al. | 381/13 |

FOREIGN PATENT DOCUMENTS 93-06391  4/1993  France .

*Primary Examiner*—Wellington Chin
*Assistant Examiner*—Congvan Tran
*Attorney, Agent, or Firm*—Vanophem Meehan & Vanophem, P.C.

[57] ABSTRACT

An electromagnetic and/or electric interference suppression device that reduces the severity of electromagnetic and/or electric interference of an asymmetric system. The suppression device utilizes an antenna to develop a voltage that is ideally equal to the interference voltage developed from interference signals. A tuned circuit having two opposing diodes, a capacitor, and an inductor mounted in series with each other, to create a voltage that approximates as closely as possible the interference voltage, neutralizing its effect on an asymmetric system.

12 Claims, 2 Drawing Sheets

ELECTROMAGNETIC INTERFERENCE SUPPRESSING DEVICE

BACKGROUND OF THE INVENTION

1. Field of Invention

The present invention relates in general to suppressing electric and electromagnetic interference and more specifically to preventing interference from affecting electronic circuitry that controls an operation such as the air mixture of gasoline in a catalytic converter of an automobile.

2. Description of the Prior Art

Due to stringent limitations on air pollution, automobile exhaust is strictly controlled in order to minimize pollutant levels. A catalytic converter is used to cleanse exhaust gases. The efficiency of the catalytic converter is heavily dependent upon a strictly controlled air/gasoline mixture. Several parameters are considered and manipulated by a computer which then acts to adjust the air/gas ratio and minimize pollutant levels. Typically, electromagnetic sensors, piezo-resistant sensors, Hall effect sensors, CTN type probes, and oxygen probes are used to collect data. The data is sent to a calculating device, such as a computer, where the data is processed and used to drive the ignition and fuel injection of the engine.

Because an electronic computer is used to manipulate the data collected by the various sensors, it is subject to electric and electromagnetic interference that may affect the results generated by the computer, adversely affecting the efficiency of the catalytic converter. The very probes used to collect the data necessary for the computer to operate create interference signals that upset the accuracy of the calculating device. Interferences from the environment external to the vehicle also upset the accuracy of the calculating device. The external interferences can also interfere with the sensors and probes as data is collected, adversely affecting the individual component as it attempts to collect data.

The interference signals disturb the engine's performance, resulting in inefficient fuel consumption and pollution. Currently there is no solution to the problem other than replacing components, which results in high operating costs for the user and high warranty costs for the manufacturer.

Electrical signals are subject to contamination from interference generated by many different sources. The signal can be filtered, or treated, in an attempt to minimize the "noise" generated by interfering signals and isolate the "useful" signal. Interference that is within the same frequency band as the "useful" signal is more difficult to treat. U.S. Pat. No. 4,081,740 to Teratani et al. discloses a capacitor connected between a voltage divider line and ground, distinct from the chassis ground. The capacitor absorbs high frequency noises appearing over the voltage divider line and ground, yet does not address amplitude differences that occur in noise interference. Likewise, U.S. Pat. No. 3,256,487 to Sinninger and French Patent No. 93-06391, which was filed in the United States, disclose a device that acts to maximize the noise to signal ratio of a system by injecting a phase opposition signal against the interference signal, which would be disastrous if used in the asymmetric system of an automotive vehicle. Injecting a phase opposition signal would double the effect of the interference voltage rather than cancel out its effects as in the present invention. The interference suppression system as taught by Sinninger requires that the phase relationship of the interference signals be different from each other, ideally 180° out of phase. Likewise, in French Patent No. 93-06391 discloses a filtering device including two light emitting diodes in parallel, and a processing device that injects a phase-opposition current on the ground parts of the machine to eliminate higher-amplitude interference. The teachings of French Patent No. 93-06391 are not only opposite the teachings of the present invention, but are functionally impossible. The processing device of the French patent is a capacitor. A capacitor cannot process amplitude, and the diodes disclosed do not filter. And as discussed above, injecting a current in phase opposition effectively doubles the interference signal rather than cancels it out.

In automotive systems, there are many components that come together and operate as a complete assembly. Individually, each of these components must meet an electromagnetic compatibility (EMC) standard. However, when the individual components are combined, the assembly may not meet the EMC standard. In addition, automotive manufacturers rely on the metallic parts of the car body as a ground, when in fact they are not. The "ground" of the car body is subject to interference generated by galvanic coupling, or conduction of current through one or several impedances that are common to two or more pieces of electrical equipment. All conductors have an inherent impedance, which is mostly negligible at low frequencies. However, harmonic currents will develop harmonic voltages through an impedance that increases as frequency increases. The harmonic voltages interfere with the "useful" signal, adversely affecting the efficiency of the catalytic converter. Magnetic and capacitive coupling can also interfere with the "useful" signal.

What is needed is a simple and cost effective device which adequately neutralizes the effect of an interference signal on an asymmetric system.

SUMMARY OF THE INVENTION

The electromagnetic interference suppression device of the present invention reduces the severity of electromagnetic interference with the operation of a catalytic converter. The electromagnetic interference suppression device utilizes an antenna to develop a voltage that is ideally equal to the interference voltage developed from interference signals.

The device of the present invention utilizes a tuned circuit having two opposing diodes, a capacitor and an inductor, mounted in series with each other, to create a voltage that approximates the interference voltage as closely as possible, neutralizing its effect on an asymmetric system.

It is an object of the present invention to neutralize the effect of an interference signal on an asymmetric system.

It is another object of the present invention to control the level of polluting emissions from automotive exhaust systems.

It is yet another object of the present invention to prevent inefficiencies in the operation of an automotive catalytic converter.

It is yet another object of the present invention to lessen the severity of electromagnetic interference.

It is still a further object of the present invention to enhance the operation of a vehicles computer control of vehicle emissions.

DETAILED DESCRIPTION OF THE PREFERRED EMBODIMENT

Figure 1:
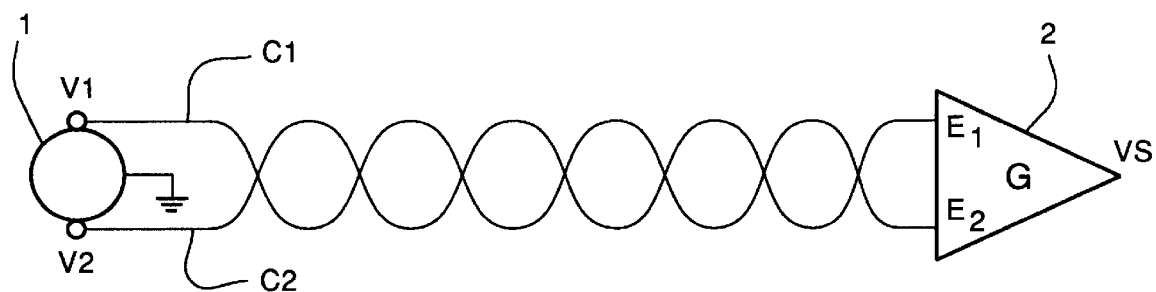
FIG. 1 is a schematic of a symmetric system including a probe, a pair of twisted conductors, and an amplifier.
Figure 2:
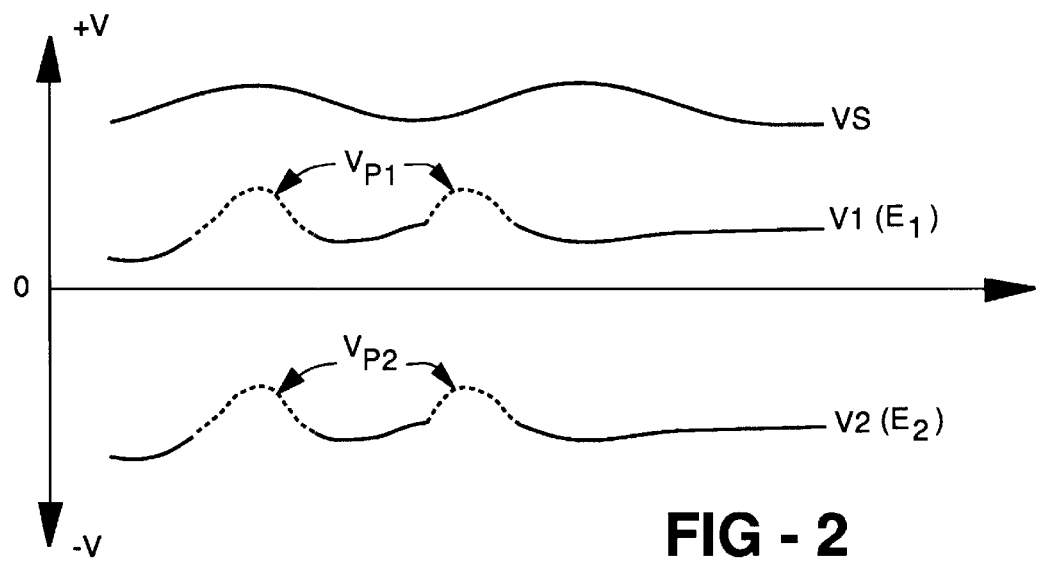
FIG. 2 is a graphical representation of an interference voltage on the symmetric system of FIG. 1.

It is generally known in the prior art that the best way to prevent electrical disturbances from affecting electrical controls is to employ a symmetric control system, as used in aerospace technology. A symmetric system is ideal within any range of frequencies. A symmetric system as shown in FIG. 1 includes a sensor 1, a pair of twisted conductors C1 and C2, and an amplifier 2 having a gain G. Referring to FIG. 2, a voltage induced by an interference signal Vp1 and Vp2, will have the same amplitude and phase on both conductors C1 and C2 of FIG. 1. An output voltage Vs is shown in FIG. 2. Each of the two conductors C1 and C2 shown in FIG. 1 has an inherent impedance. The amplifier inputs are E1 and E2. The voltage signal Vs will have the opposite sign on each conductor. Therefore, when $$Vs = G(E1-E2) \quad (1)$$

we have:

$$E1-(-E1) = E1+E1 \quad (2)$$

or $$Vs = 2E1 \times G \quad (3)$$

The interference signal, $$Vp1-(Vp2) = Vp1-Vp2 \quad (4)$$

If $$Vp1 = Vp2 \quad (5)$$

then the interference signal output voltage will be zero. Unfortunately the elementary rules of symmetry are not employed in the automotive industry, primarily for cost reasons.

Figure 3:
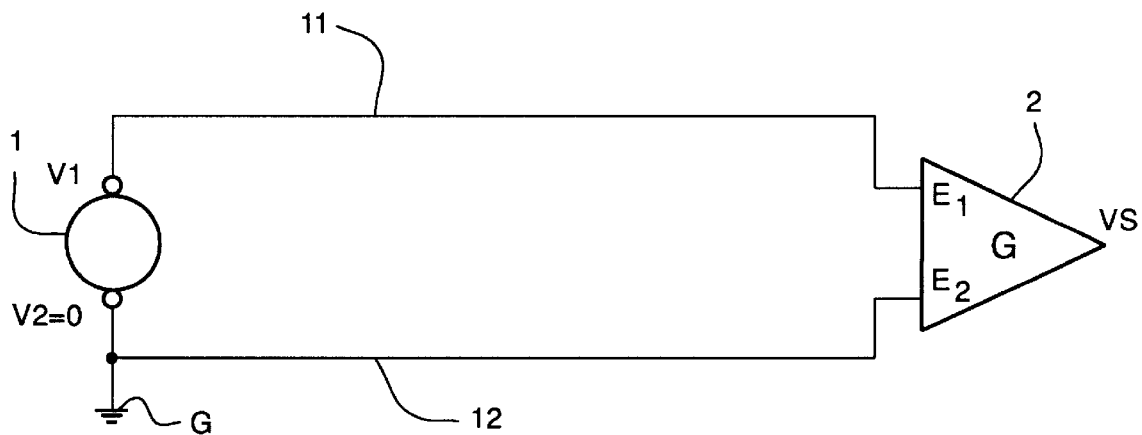
FIG. 3 is a schematic of an asymmetric system including a probe, two conductors, and an amplifier.

An asymmetric system that is used in automotive technology is best shown in FIG. 3. In an asymmetric system, individual conductors 11 and 12 are used as opposed to the pair of conductors C1 and C2 used in a symmetric system. One of the conductors 11 of an asymmetric system is attached to a source 1, and the other conductor 12 is attached directly to the system ground G. As discussed above, the "ground" used in the automotive industry is the metal parts of the vehicle's body and not an actual ground, giving rise to potential interference.

Figure 4:
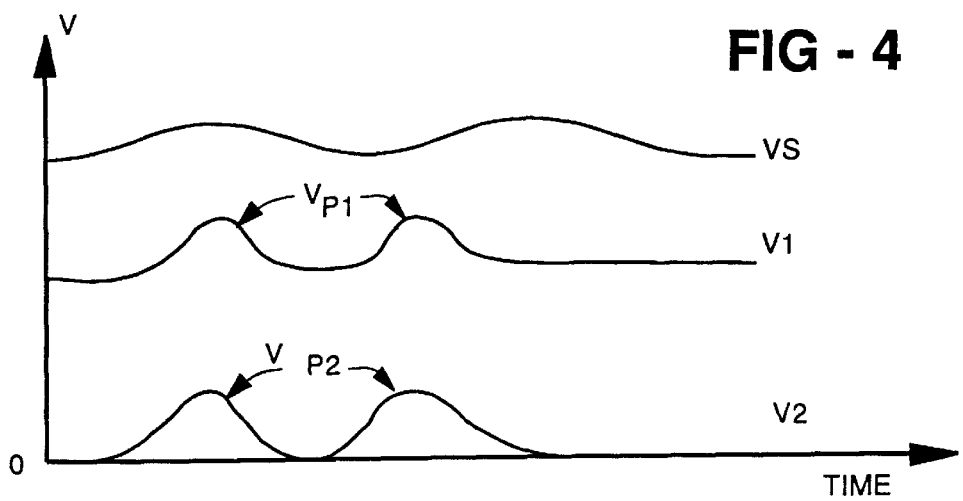
FIG. 4 is a graphical representation of an interference voltage on the asymmetric system of FIG. 3.

In an asymmetric system, a transient, or interference signal, created by the sensor 1 will occur only on one conductor 11, whose amplitude is then magnified by the gain G of the amplifier 2. This is shown schematically in FIG. 4. Referring to FIG. 3, a voltage V1 is applied to input E1. The voltage at E2 is zero. Therefore, using formula (1) from above:

$$Vs = G(E1-E2) \quad (6)$$

or $$E1-E2 = (V1-0) \quad (7)$$

If an interference voltage Vp1 is induced on the conductor 11, the voltage at input E1 would be:

$$E1 = V1 + Vp1 \quad (8)$$

where $$E2 = V2 = 0 \quad (9)$$

and $$E1-E2 = V1+Vp1 \quad (10)$$

In this example, the voltage at Vs would be:

$$Vs = G(V1+Vp1) \quad (11)$$

whereby the interference voltage Vp1 passes through and is magnified by the gain of the amplifier.

Figure 5:
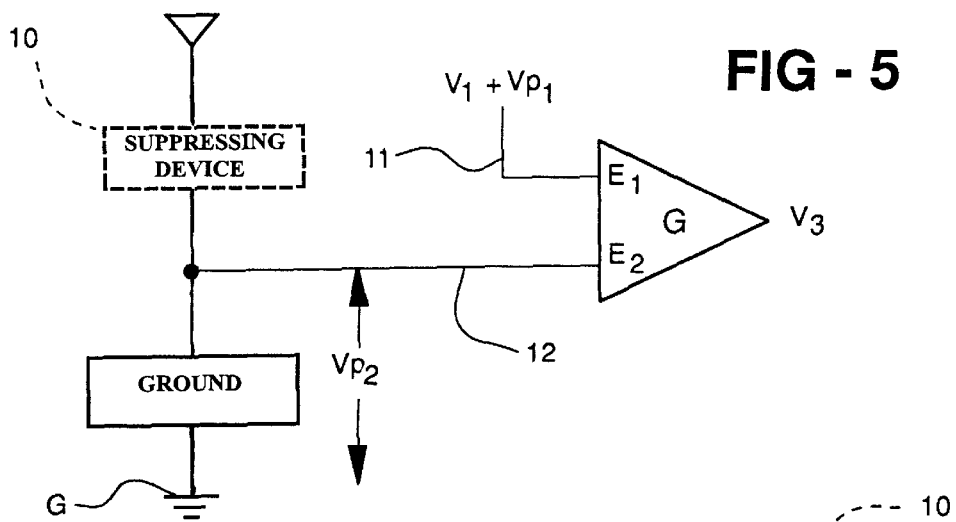
FIG. 5 is a schematic of an asymmetric system depicting the location of the interference suppressing device of the present invention.

The present invention minimizes the effect of an interference voltage Vp1 induced by an interference signal at the amplifier 2 by introducing a signal Vp2 that is closely matched to the interference voltage Vp1, thereby reducing the effect of the interference signal and simulating a symmetric system. The objective in an ideal world is for Vp2 to equal Vp1. However, in a real world, ideal values are not always possible, and slight variations are present for unknown reasons. A person of ordinary skill in the art is aware of the difficulty in arriving at a value of Vp2 that is exactly equal to Vp1. The value of Vp2 should match as closely as possible the value of Vp1. The closer Vp2 matches Vp1, the greater the reduction in the effect of the interference signal. Referring to FIG. 5, the suppressing device 10 of the present invention is attached to the ground conductor 12. The suppressing device 10 introduces a voltage Vp2 that is equal to the interference voltage Vp1 that occurs on the conductor 11 to input E1.

Therefore, using the formula (2) from above:

$$E1-E2 = (V1+Vp1)-(V2+Vp2) \quad (12)$$

since $$Vp1 = Vp2 \quad (13)$$

$$E1-E2 = V1-V2 \quad (14)$$

and since the conductor 12 is attached directly to ground, $$V2 = 0 \quad (15)$$

and $$E1-E2 = V1. \quad (16)$$

The circuit is void of the interference signal.

Figure 6:
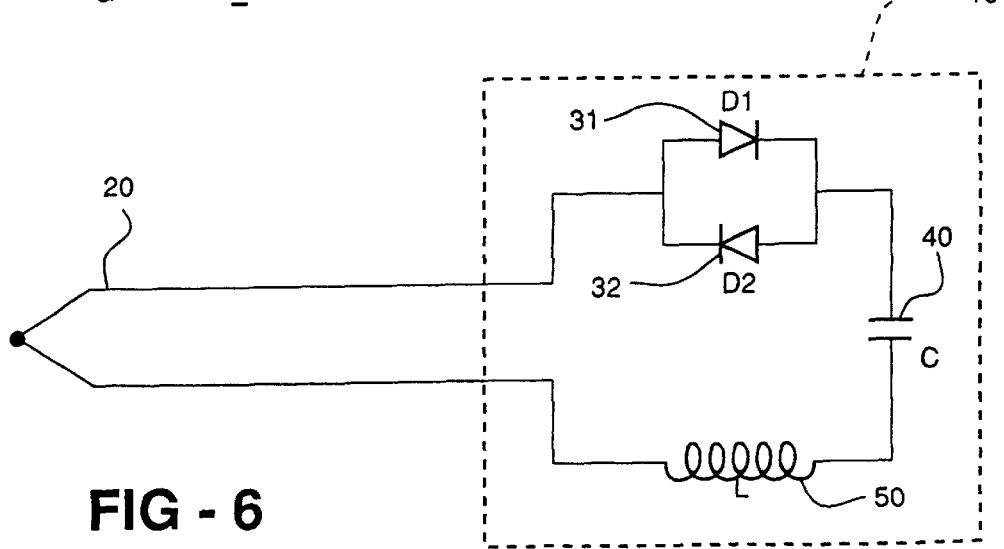
FIG. 6 is a schematic of the interference suppressing device of the present invention.

Referring now to FIG. 6 the suppressing device 10 of the present invention is generally shown. The device 10 includes an antenna 20, two opposing diodes 31 and 32, a capacitor 40, and an inductor 50. The antenna 20 has been tuned to a pass-band within the frequency spectrum of the interference signals. The tuning has been performed empirically from the results of exhaust gas analysis. A catalytic converter in good operating condition yields the following gas analysis results:

CO: 0
$CO_2$: 15.6
HC: 0
$O_2$: 0 to 0.03
NOX: 0

Any vehicle which does not show this gas analysis has been affected by an interference signal.

The tuned circuit can be changed and tuned to the interference amplitudes by means of the two opposing diodes 31 and 32, which act in a capacitive manner for lower frequency interferences. The opposing diodes 31 and 32 are effective only to a certain predetermined frequency. For larger amplitude interferences, the diodes 31 and 32 will behave resistively. In such cases, the tuning frequency of the suppressing device 10 of the present invention 10 is controlled by the capacitor 40. The pass-band of the suppressing device 10 will increase in width as the interference voltage Vp1 rises. The inductance is detected at the inductor 50, and the whole system creates a current which passes through an impedance (Z) as shown in FIG. 5, creating a voltage Vp2 across the ground conductor 12 whose value is as close as possible to the interference voltage Vp1 across the conductor 11 as shown in 1 FIG. 5. The voltages Vp1 and Vp2 effectively cancel each other out, and the asymmetric system simulates the efficiency of a symmetric system. The interference voltage Vp1 has no effect on the output of the amplifier and subsequently no effect on the data that is sent to the computer for processing.

The suppressing device of the present invention allows an asymmetric system to simulate the efficiency of a symmetric system. The present invention is most effective within the range of 50 kHz to 3 MHz. The severity of electromagnetic interference is reduced, enhancing the computer controlled operation of the vehicle. The calculating device will efficiently control the level of polluting emissions from the exhaust system by avoiding interference signals that would affect the operation of the catalytic converter.

While a specific embodiment of the invention has been described, it will be clear that variations in the details of the preferred embodiment may be made without departing from the scope of the invention as described in the appended claims.

What is claimed is:

1. An asymmetric device having at least one sensor, an amplifier, a noise suppression device, and at least two conductors connected to inputs of said amplifier, one of said at least two conductors being a ground conductor such that said ground conductor is attached to a system ground and connected to said noise suppression device, said ground conductor having a natural impedance and an other one of said at least two conductors being connected to a source, said device comprising:

means for collecting an interference signal generated by said at least one sensor on one of said at least two conductors other than said ground conductor; means for tuning connected in series with said means for collecting, said means for tuning operating based upon a frequency of said interference signal; and means for injecting current into said ground conductor connected in series with said means for tuning, said means for injecting current creating a voltage across said impedance of said ground conductor, said voltage having a value approximating said interference signal whereby said asymmetric device simulates a symmetric system.

2. The device of claim 1 wherein said means for collecting said interference signal further comprises an antenna.

3. The device of claim 1 wherein said means for tuning further comprises two opposing parallel diodes.

4. The device of claim 1 wherein said means for tuning further comprises a capacitor.

5. The device of claim 1 wherein said means for tuning further comprises:

two opposing parallel diodes; and a capacitor in series with said two opposing parallel diodes.

6. The device of claim 1 wherein said means for injecting current further comprises an inductor.

7. A device for minimizing an interference signal of an asymmetric system having at least one sensor, an amplifier, a device for minimizing an interference signal, and at least two conductors connected to said amplifier, one of said at least two conductors being a ground conductor such that said ground conductor is attached to a system ground, said ground conductor having a natural impedance, said device comprising:

an antenna for collecting said interference signal;

two opposing parallel diodes in series with said antenna, said two opposing parallel diodes acting capacitively up to a first predetermined frequency;

a capacitor in series with said two opposing parallel diodes, whereby said capacitor acts capacitively up to a second predetermined frequency higher than said first predetermined frequency; and an inductor in series with said capacitor for injecting a current into said amplifier whereby said asymmetric system simulates a symmetric system minimizing the effect of said interference signal.

8. A device for minimizing the effect of an interference signal of an asymmetric system of an automobile having at least one sensor, an amplifier having a first input and a second input, a device for minimizing an interference signal, and at least two conductors connected to said amplifier, one of said at least two conductors being a ground conductor such that said ground conductor is attached to a chassis of said automobile, said ground conductor having a natural impedance, said device comprising:

an antenna for collecting said interference signal;

two opposing parallel diodes in series with said antenna, said two opposing parallel diodes acting capacitively up to a first predetermined frequency;

a capacitor in series with said two opposing parallel diodes, whereby said capacitor acts capacitively up to a second predetermined frequency higher than said first predetermined frequency; and an inductor in series with said capacitor for injecting a current into said amplifier whereby said asymmetric system simulates a symmetric system minimizing the effect of said interference signal.

9. A method for minimizing the effect of an interference signal of an asymmetric system of an automobile having at least one sensor, an amplifier having a first input and a second input, and at least two conductors, one of said at least two conductors being a ground conductor such that said ground conductor is attached to a chassis of said automobile, said ground conductor having a natural impedence, said method comprising the steps of:

collecting an interference signal by an antenna;

tuning said antenna to operate on a frequency that is the same as a frequency of said interference signal;

injecting current into said ground conductor creating a voltage across said natural impedance of said ground conductor, said voltage approximating said interference signal whereby said asymmetric system simulates a symmetric system.

10. The method as claimed in claim 9 wherein said step of tuning said antenna further comprises tuning said antenna by means of two opposing diodes in parallel to each other and in series with said antenna.

11. The method as claimed in claim 10 wherein said step of tuning said antenna further comprises tuning said antenna by means of a capacitor in series with said two opposing diodes in parallel to each other, said capacitor in series with said antenna.

12. The method as claimed in claim 9 wherein said step of injecting said current into said ground conductor further comprises injecting current by means of an inductor in series with said antenna.

* * * * *

UNITED STATES PATENT AND TRADEMARK OFFICE
CERTIFICATE OF CORRECTION

PATENT NO.    : 6,061,554
DATED         : May 9, 2000
INVENTOR(S)   : Castella

It is certified that error appears in the above-identified patent and that said Letters Patent is hereby corrected as shown below:

Column 1,
Line 65, after "Likewise," delete -- in --.

Column 5,
Line 23, after "in" delete -- 1 --.

Signed and Sealed this

Twenty-third Day of October, 2001

Attest:

*Nicholas P. Godici*

NICHOLAS P. GODICI
*Attesting Officer*    *Acting Director of the United States Patent and Trademark Office*